United States Patent [19]
Taylor

[11] Patent Number: 5,110,476
[45] Date of Patent: May 5, 1992

[54] HOLLOW FIBER MEMBRANE SYSTEM FOR REMOVAL OF VIRUSES AND BACTERIA

[75] Inventor: John A. Taylor, Pinckney, Mich.
[73] Assignee: Separation Dynamics, Inc., Southfield, Mich.
[21] Appl. No.: 506,902
[22] Filed: Apr. 10, 1990
[51] Int. Cl.$^5$ .............................................. C02F 1/44
[52] U.S. Cl. .................... 210/640; 210/644; 210/647; 210/650; 210/500.29
[58] Field of Search .............. 210/640, 651, 500.29, 210/644, 647, 650

[56] References Cited
U.S. PATENT DOCUMENTS
4,725,359 2/1988 Ray .................................. 210/640

FOREIGN PATENT DOCUMENTS
1254202 11/1986 Japan ............................. 210/500.29

*Primary Examiner*—Frank Spear
*Attorney, Agent, or Firm*—Reising, Ethington, Barnard, Perry & Milton

[57] ABSTRACT

A method of disinfecting water includes the steps of passing a flow of fluid containing water and/or water soluble substances and microbes therein in contact with a nonporous water and water soluble substance permeating membrane and imbibing water and/or water soluble substances through the membrane while preventing passage of microbes and water insoluble hydrocarbons and hologenated hydrocarbons through the membrane.

6 Claims, 1 Drawing Sheet

HOLLOW FIBER MEMBRANE SYSTEM FOR REMOVAL OF VIRUSES AND BACTERIA

TECHNICAL FIELD

The present invention relates to a process for removing microbial contamination from water and other water soluble fluids. More specifically, the present invention is directed to the use of nonporous water and water soluble substance permeating membranes for removing bacteria and viruses, as well as water insoluble hydrocarbons from a water supply.

BACKGROUND OF THE INVENTION

Various industries require sterilized water based fluids in the production of products. For example, various pharmaceuticals are dissolved in sterile water, many beverages require sterile water, and people are desirous of bacteria and virus free drinking water. Specifically, with regard to the beverage industry, there are various spring water based beverages including water and water soluble substances (i.e. minerals) which must be purified of microbes and various hydrocarbons. The U.S. Pat. No. 4,857,081 to applicant and assigned to the assignee of the present invention, issued Aug. 15, 1989, provides a process for separating hydrocarbons and halogenated hydrocarbons from water contaminated therewith. The process utilizes hollow fibers made from regenerated cuproammonium or viscose cellulose. The hollow fibers are tubular nonporous membranes. The process provides a means for drying hydrocarbons and halogenated hydrocarbons, as well as providing a water permeate free of hydrocarbons and halogenated hydrocarbons.

The U.S. patent application Ser. No. 348,893 to applicant and assigned to the assignee of the present invention, filed May 8, 1989, provides a portable device for in situ purification of suspect water wherein microbial agents such as viruses, bacteria, molds, algae and other micro-organisms such as parasites may be effectively removed from available water supplies. The invention provides evidence of the removal of various hydrocarbons from water, as well as the removal of algae from water. The application hypothesizes the use of the invention for the removal of microbes, but there is no evidence presented supporting the ability of the hollow fiber membranes utilized in the system for the removal of minute particulates, such as viruses. The invention disclosed and claimed therein is characterized by the plunger assembly used for pumping the water from a reservoir and through the hollow fiber separating membranes thereof.

The U.S. Pat. No. 4,547,289 to Okano et al, issued Oct. 15, 1985, relates to a filtration apparatus for removing undesirable components from a solution to be treated. The apparatus includes hollow fiber made from membranes such as polysulfones, polyacrylonitriles, various celluloses such cellulose acetate, polyamides, polycarbonates and polyvinylalcohols, although the polysulfones are stated to be the preferred membrane for use. All of the aforementioned membranes, including the specific cellulose acetate example, are porous membranes. These devices provide separation by filtration of substances dependent upon their size and being able to be sieved through the pores of the membrane. Further, when the bundle of hollow fibers comprising the system has deteriorated or has become blocked in the manufacture of purified water, a new bundle of hollow fibers is used to replace the old bundle.

The present invention provides an improved method of disinfecting water wherein a nonfouling membrane system is used for separating water and water soluble substances from water contaminated with microbes, as small as bacterial and viruses. Further, the subject method separates the water and/or water soluble substances from water insoluble hydrocarbons. In other words, the present invention removes minute particulates as well as hydrocarbons from water and water soluble substances. This cannot be achieved by size dependent filtration systems such as that disclosed in the Okano et al patent because many of the minute viruses as well as certain hydrocarbons are of sizes capable of passing through the ultrafiltration type membranes. The present invention, by not using a sieve but rather by utilizing a membrane which imbibes water from a water and/or water soluble substances from a water mixture effectively prevents the passage of microbes and water and soluble hydrocarbons through the membrane thereby providing truly disinfected water.

SUMMARY OF THE INVENTION

In accordance with the present invention, there is provided a method of disinfecting water including the steps of passing a flow of fluid containing water and/or water soluble substances and microbes therein in contact with a nonporous water and water soluble substance permeating membrane and imbibing water and/or water soluble substances through the membrane while preventing passage of microbes and water insoluble hydrocarbons through the membrane.

FIGURES IN THE DRAWINGS

Other advantages of the present invention will be readily appreciated as the same becomes better understood by reference to the following detailed description when considered in connection with the accompanying drawings wherein:

FIG. 1 is a perspective view of a separator module used in accordance with the subject method; and FIG. 2 is a enlarged cross sectional view of a membrane hollow fiber illustrating the subject inventive method.

DETAILED DESCRIPTION OF THE INVENTION

Figure 1:
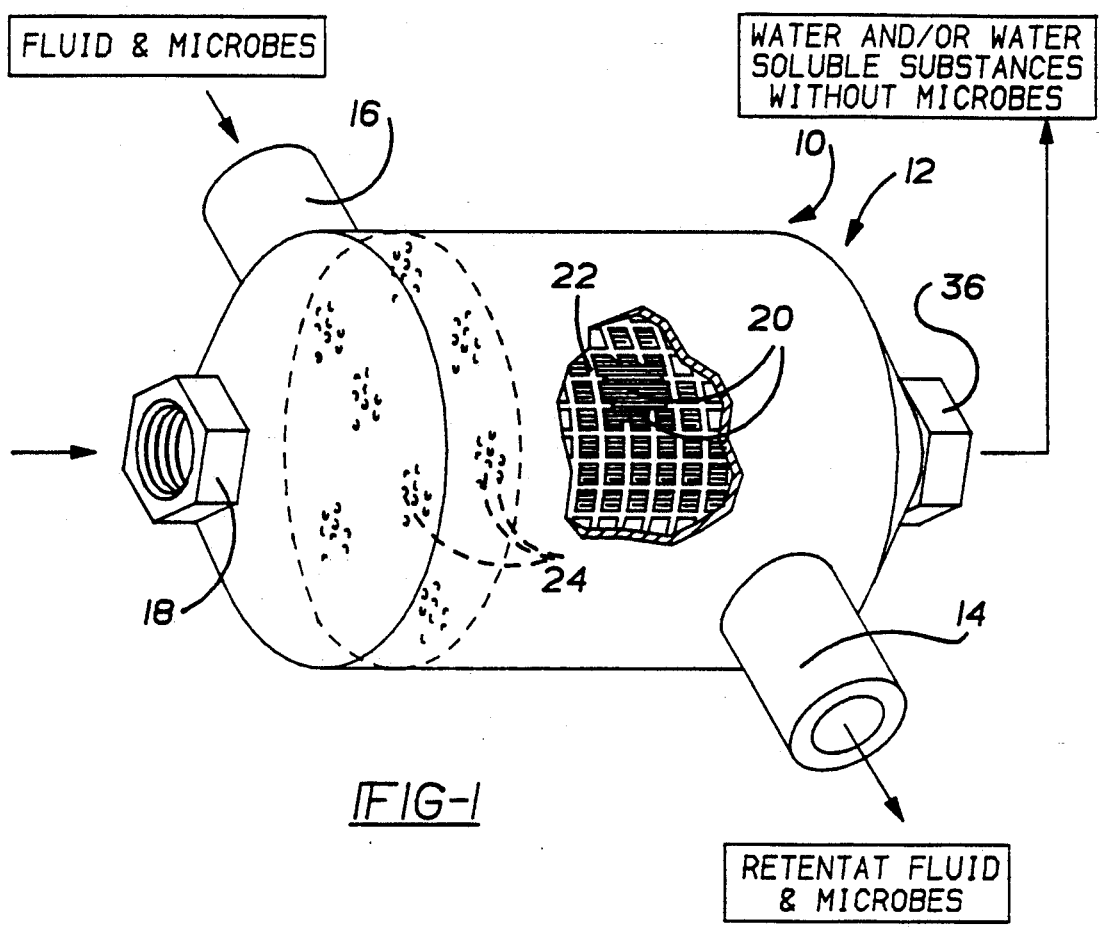

An apparatus for use in conjunction with the subject inventive method is shown in FIG. 1. The apparatus comprises a module generally indicated at 10 including a housing generally shown at 12. The housing 12 includes a mixture inlet 14 for receiving a flow of fluid containing water and/or water soluble substances and microbes therein. The fluid may also include hydrocarbons and/or halogenated hydrocarbons. Examples of water soluble substances are various salts and minerals, such as sodium, chloride, calcium chloride, as well as hydrocarbons which may be somewhat soluble in water, such as low molecular weight alcohol such as ethyl alcohol. Additionally, gases such as air are water soluble.

The housing further includes a retentate outlet 16 for releasing a flow of retentate fluid from the housing 12. The housing 12 includes a permeate outlet 18 allowing for the release of disinfected water from the module 10.

The housing 12 contains and supports a plurality of polyglucose fibers such as regenerated cuproammonium or viscose cellulose fibers. Such fibers for the use of separating hydrocarbons and halogenated hydrocarbons from a water permeate are discussed in detail in the U.S. Pat. No. 4,857,081 to applicant, issued Aug. 15, 1989. These preferred membranes are composed of regenerated cellulose such as made from viscose or cuproammonium processes. Regenerated cellulose hollow fibers are convenient for employment as the membrane in such a water disinfecting module and have the ability of separating water and water soluble substances from viruses, bacterial, molds, algae, and other microorganisms such as parasites. The membranes are also capable of removing oily contamination from suspect water simultaneously with the removal of the microorganisms. The membranes are nonporous in nature and capable of permeation of water while being nonpermeable to water and soluble products including the above-mentioned microbes, as well as many hydrocarbons and halogenated hydrocarbons. The membranes do not degrade when placed in contact with contaminates such as hydrocarbons and halogenated hydrocarbons. Further, the membranes are nonfouling. Unlike prior art porous membranes having pores which can clog and thereby disrupt water flow through the membranes, the present invention provides a nonporous water and water soluble substance permeating membrane which imbibes water and/or water soluble substances therethrough. The water dissolves in the membrane and passes therethrough as opposed to flowing through pores in the membrane. Alternatively, supported cuproammonium membrane fibers can be used, as disclosed in the copending U.S. patent application Ser. No. 402,229, filed Sep. 5, 1989.

Figure 2:
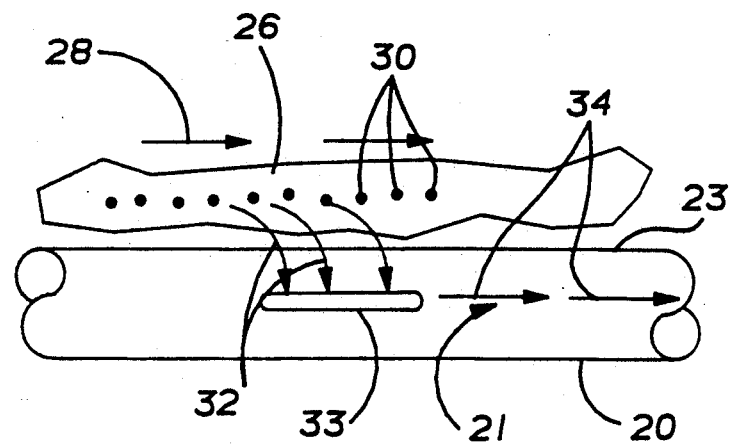

The housing 12 includes a plurality of hollow fibers 20 supported within a polyurethane tube sheet 42. The fibers are imbedded in a potting material 44 adjacent the inlet 14 and outlet 18. As shown in FIG. 2, each fiber 20 includes a hollow core 21 having an inner surface extending about the hollow core. Each fiber 20 also includes an outer surface 23. The plurality of hollow cores 21 of the plurality of fibers 20 within the module housing 12 define a plurality of first passageways in fluid communication with outlet 18. The housing 12 in combination with the outer surfaces 23 of the fibers 20 define a second passageway or chamber in fluid communication between the mixture inlet 14 and retentate outlet 16.

FIG. 2 provides an enlarged schematic representation of a hollow fiber constructed in accordance with the present invention illustrating the subject method. A flow of fluid is schematically shown at 26, the arrows 28 indicating the direction of flow of the fluid. Microbial particulates such as bacteria and viruses are schematically shown at 30. Arrows 32 indicate imbibing of the water and water soluble substances through the membrane and into the hollow core 21 of the membrane. Arrows 34 show the disinfected water and water soluble substances 33 flowing through the core to be removed from the module 12.

In accordance with the present invention, generally there is provided a method of disinfecting water including the steps of passing a flow of the fluid 26 containing water and water soluble substances and microbes 30 therein in contact with the nonporous water and water soluble substance permeate membrane 23 and imbibing water and/or water soluble substances through the membrane 20 while preventing the passage of microbes and water and water insoluble hydrocarbons and halogenated hydrocarbons through the membrane 20. More specifically, the fluid 26 is passed adjacent to and in contact with the outer surface 23 of the nonporous hollow fibers 20 made from cuproammonium regenerated cellulose. The water and water soluble substances are imbibed from the flow of water and removed from the inner surface 21 of the fiber.

For example, a sweep stream can be flowed through the inner cores 21 of the membranes 20, having an inlet 36 in communication with the hollow cores 21 of the membranes 20. Alternatively, inlet 36 can be capped and the disinfected water 33 can be removed by gravity flow. The water containing the microbes and possibly hydrocarbons and/or halogenated hydrocarbons therein is conducted into the inner chamber of the housing 12 through inlet 14. Retentate fluid not imbibed by the fibers 20 is continually evacuated from the chamber as the water flow continually enters the chamber through inlet 14 thereby preventing buildup and stagnation of microbes in the chamber. Thusly, the module is substantially self-cleaning of microbes as well as being nonfouling.

As stated above, the preferred embodiment of the invention shown in FIG. 1 shows the water mixture flowing over the outer surfaces 23 of the membranes 20 and the disinfected water being removed from the inner surfaces 21 of the fibers 20. Alternatively, this system can be run in the reverse direction having the mixture of water flowing through the inner cores 21 of the fibers 20 and the disinfected water being removed from the outer surface 23 of the fibers 20.

The present invention is not solely limited to the disinfection of water. Hollow fibers made in accordance with the present invention, such as cuproammonium regenerated cellulose hollow fibers are permeable to air when wetted. Accordingly, the inventive method can include the step of passing air containing microbes, such as bacteria and viruses, therein in contact with a wetted hollow fiber membrane from cuproammonium regenerated cellulose and then imbibing air through the membrane while preventing passage of microbes through the membrane. The membrane would further prevent the passage of any hydrocarbons or halogenated hydrocarbons in the air through the membrane.

Experimental Evidence

An experiment was conducted to determine the efficiency of the inventive method utilizing a hollow fiber membrane system for removal of viruses from aqueous solution A system constructed in accordance with the module shown in FIG. 1 was utilized. The module utilized a plurality of unsupported nonporous cuproammonium regenerated cellulose membranes.

The human enterovirus, echovirus 6 was used for this study. Echovirus 6 belongs to the picornaviriva family, which is composed of the smallest known RNA viruses (approximately 25 nm in diameter). A concentrated virus preparation ($8.0 \times 10^7$ plaque forming units) in a physiological salt solution containing phenol red (phenolsulfonephthalein) and 5% cath serum was applied to the module. The membranes were eluted with phosphate buffered saline to a final volume of 3.5 times the retention volume of the fibers. Sequential samples (5) of the eluates were taken during the separation process and assayed for the presence of virus. A sample of the initial concentrated virus preparation, that was kept under the same conditions during the filtration process, was assayed in parallel as a positive control. The control virus preparation was not inactive during the experiment.

Neither virus activity nor presence of phenol red was detected in any of the eluates. The eluates were tested at dilutions that would detect as little as 100 virus plaque forming units. These results indicate that, under the conditions used in this study, the separation module used in accordance with the present inventive method has the capability of eliminating at least 99.999% of virus infectivity from contaminated solutions and prevents the penetration of a small organic dye which has a molecular weight of 354.

The above data shows that the subject inventive method can be used to separate microbes as small as 25 nm from passing through the membrane 20 with the water and water soluble substances.

The present invention can have several applications. For example, in research laboratories, it is often necessary to sterilize labile solutions by filtration. The available membranes are usually fragile, become clogged with serum-containing solutions and are not reusable. In contract, a membrane apparatus used in accordance with the present invention may be reusable and efficient in removing viruses, serum, and certain dyes. Thus, the present invention has desirable properties that could be utilized by laboratories conducting research in several different disciplines such as verology, microbiology, molecular biology, and immunology as well as in diagnostic laboratories.

Other potential uses for the present invention are in the decontamination of sewage and the purification of water. The enteroviruses and hepatitis viruses are relatively stable viruses that can survive in sewage and water for several day. Use of the present invention can eliminate those viruses and prevent epidemics of diseases caused by these viruses. It is also possible that the present invention can be applicable to medical procedures and the removal of toxics or infected agents.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method of water, said method including the steps of: passing a flow of fluid containing water and/or water soluble substances and microbes therein in contact with a nonporous water and water soluble substance permeating membrane, and imbibing and disinfecting the water and/or water soluble substances through the membrane independent of size of the molecule in the fluid and convective pressure while preventing passage of microbes and water insoluble hydrocarbons and halogenated hydrocarbons through the membranes.

2. A method as set forth in claim 1 wherein said passing step is further defined as passing the flow of water adjacent to and in contact with one side of a nonporous hollow fiber having an outer and inner surface, the fiber being made from cuproammonium regenerated cellulose, said imbibing step being further defining as imbibing water and water soluble substances from the flow of water and removing the imbibed water and water soluble substance from the other side of the fiber.

3. A method as set forth in claim 2 further including the step of conducting the water containing microbes therein into a chamber containing the hollow fibers and evacuating retentate water containing microbes from the chambers as the water continually enters the chamber for preventing buildup and stagnation of microbes in the chamber.

4. A method as set forth in claim 3 wherein said imbibing step is further defined as imbibing water and water soluble substances through the membrane while preventing microbes as small as 25 nm from passing through the membrane with the water and water soluble substances.

5. A method as set forth in claim 4 wherein said passing step is further defined as passing the flow of water containing microbes over the outer surface of the fiber, said method further including the step of actively removing the water and water soluble substances from the inner surface of the membrane.

6. A method as set forth in claim 2 further including the step of wetting the membrane, said passing step being further defined a passing air containing microbes therein in contact with the membrane, said imbibing step being further defined as imbibing air through the membrane while preventing passage of microbes through the membrane.

* * * * *